Patented Apr. 14, 1931

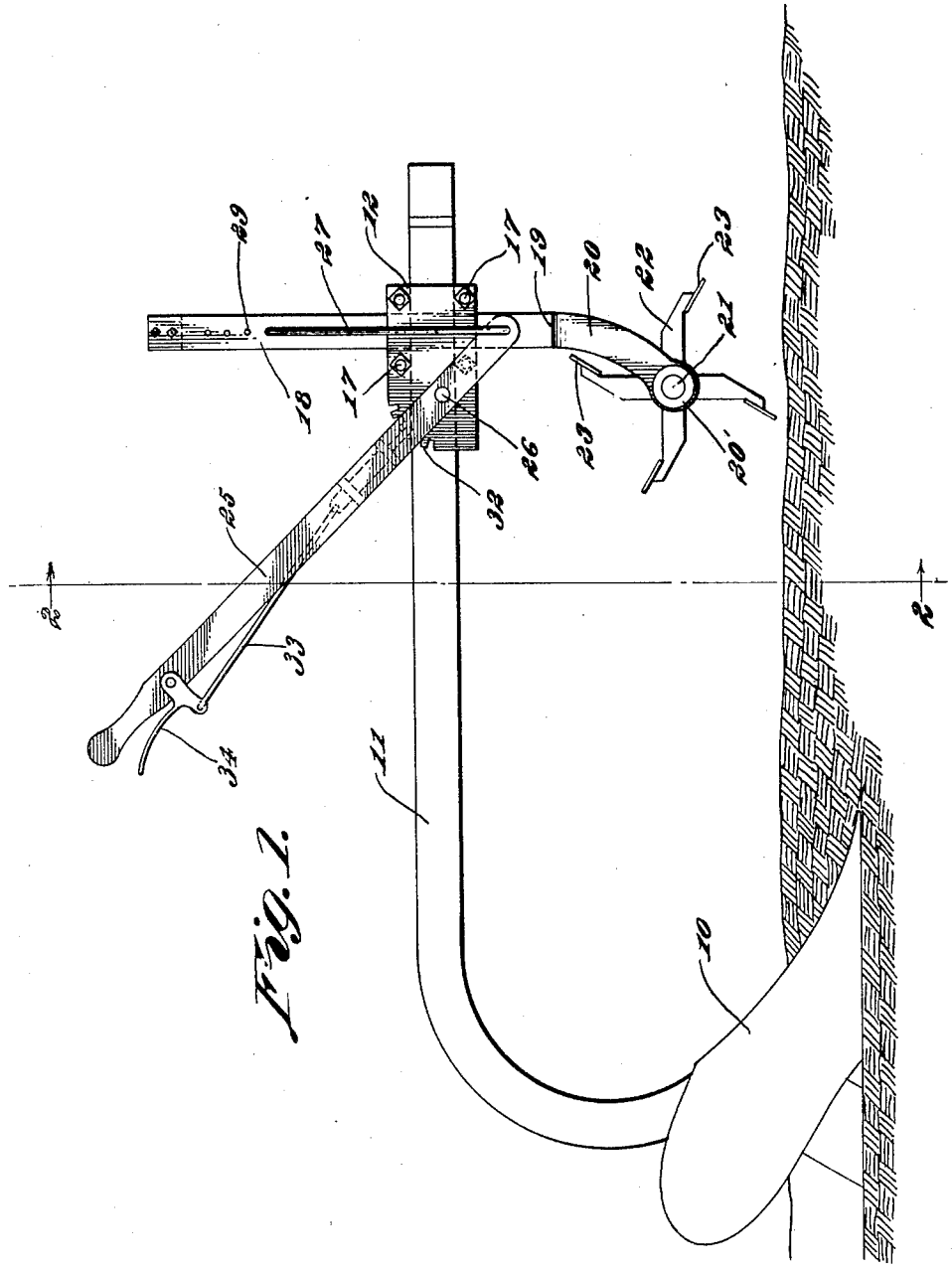

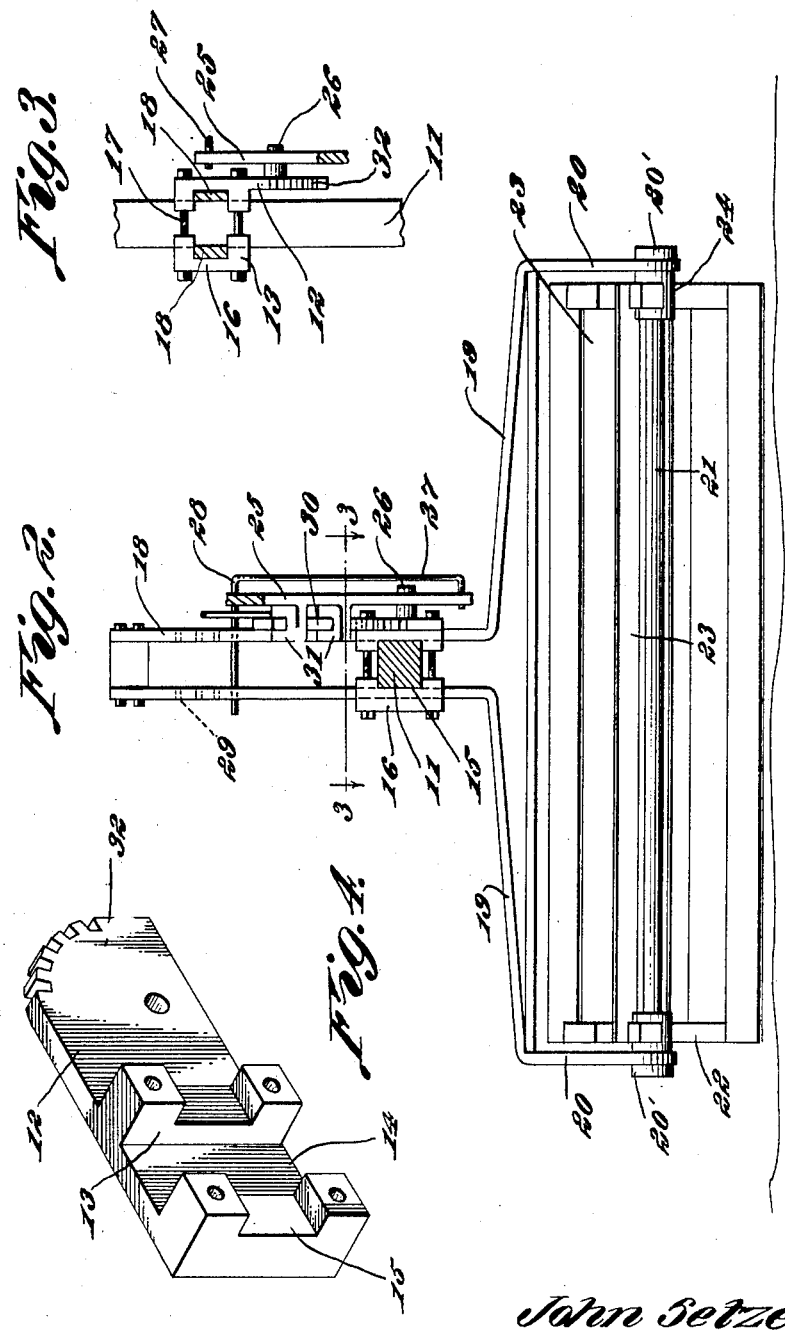

1,801,116

UNITED STATES PATENT OFFICE

JOHN SETZER, OF DAVILLA, TEXAS

STALK CUTTER

Application filed June 11, 1930. Serial No. 460,477.

This invention relates to certain new and useful improvements in the agricultural art and more particularly to those forms of implements employed for the purpose of cutting corn stalks and cultivating.

One of the principal objects of the invention embodies an implement of this character having vertical adjustment toward and away from the soil.

Another object of the invention consists of an adjusting lever for this purpose conveniently located upon a plow beam or frame of the other types of implements.

With the above and other objects in view, the invention further consists of the following novel features and details of construction, to be hereinafter more fully described, illustrated in the accompanying drawings and pointed out in the appended claims.

In the drawings:—

Figure 1 is a side elevation of the present invention applied for use upon a plow beam.

Figure 2 is a sectional view taken on line 2—2 of Figure 1.

Figure 3 is a horizontal sectional view taken on line 3—3 of Figure 2.

Figure 4 is a perspective view of the guide and mounting for the cutter frame and operating lever respectively.

Referring to the drawings in detail wherein like characters of reference denote corresponding parts, the reference character 10 indicates generally a plowshare having the conventional form of plow beam 11 connected therewith and outwardly projected therefrom in the manner shown.

A plate member 12 arranged upon one side of the plow beam 11 has spaced parallel vertically disposed ribs 13 upon the inner face thereof and defining a channel or groove 14 therebetween. The ribs are each provided with cut-out or recessed portions 15 aligned to accommodate an appropriate portion of the beam 11 in the manner shown in Figure 2 of the drawings. A plate member 16 constructed after the manner of and designed for co-operation with the plate 12 is associated in like manner with the opposite side of the plow beam and joined to the plate member 12 through the employment of fastenings 17.

The cutter or cultivator comprises spaced parallel vertically disposed standards 18 slidably accommodated within the grooves 14 of the plates 12 and 16 respectively. Arm portions 19, carried by and downwardly and outwardly obliquely inclined from the lowermost ends of the standards 18 beyond the grooves 14, terminate to provide depending legs 20 having boxings 20' for accommodating the respective ends of an axle 21. Said axle is provided with blade carrying arms 22 having supported therebetween cutting elements 23 in the manner suggested in Figure 1 of the drawings. Hub portions 24, arranged upon the axle 21 and from which the blade carrying arms 22 radiate, abut the inner sides of the depending legs 20 to restrict lateral shifting motion of the cutter assemblage.

An operating lever 25 pivotally and eccentrically mounted, as at 26, upon the plate 12 has the shorter end thereof connected with the lowermost offset extremity of a connecting rod 27 which has its uppermost end formed with a laterally projecting portion 28 disposed within registering openings 29 provided in the standards 18. A locking dog 30 shiftably mounted between spaced parallel apertured ears 31 arranged upon one side of the operating lever 25 is designed for selective reception between the teeth of a segment portion 32 formed upon the rearmost extended portion of the plate member 12. A connecting rod 33 and handle lever 34 provide the means for simultaneously actuating the locking dog 30 when the adjusting lever 25 is shifted to occupy its respective positions. It is to be noted that the standards 18 will be raised and lowered verically of the plow beam 11 as the lever 25 is shifted over the segmental portion 32 whereby the cutting elements may be adjusted with relation to the ground surface.

The invention is susceptible of various changes in its form, proportions and minor details of construction and the right is herein reserved to make such changes as properly fall within the scope of the appended claims.

Having described the invention, what is claimed is:—

1. A stalk cutting attachment for connection with the beams of agricultural implements, a stalk cutter having spaced standards slidably mounted against the opposite sides of the beam, guide plates for the standards upon the beam, and an operating lever journaled upon one of the guide plates having operative connection with the standards to facilitate vertical adjustment of the cutter.

2. A stalk cutting implement for connection with the beams of agricultural implements, a stalk cutter having spaced standards slidably mounted against the opposite sides of the beam, guide plates for the standards upon the beam, an operating lever shiftably mounted upon one of the plates, a connecting element establishing adjustable connection between the operating lever and standards, and mechanically operated means upon the lever lockingly retaining the cutter in vertically adjusted position.

In testimony whereof I affix my signature.

JOHN SETZER.